US012748983B2

(12) United States Patent
Nachum et al.

(10) Patent No.: US 12,748,983 B2
(45) Date of Patent: Sep. 29, 2026

(54) IDENTIFYING AND CORRECTING LABEL BIAS IN MACHINE LEARNING

(71) Applicant: Google LLC, Mountain View, CA (US)

(72) Inventors: Ofir Nachum, Palo Alto, CA (US); Hanxi Heinrich Jiang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 967 days.

(21) Appl. No.: 17/298,766

(22) PCT Filed: Oct. 16, 2019

(86) PCT No.: PCT/US2019/056445
§ 371 (c)(1),
(2) Date: Jun. 1, 2021

(87) PCT Pub. No.: WO2020/146028
PCT Pub. Date: Jul. 16, 2020

(65) Prior Publication Data
US 2022/0036203 A1 Feb. 3, 2022

Related U.S. Application Data

(60) Provisional application No. 62/789,115, filed on Jan. 7, 2019.

(51) Int. Cl.
*G06N 5/022* (2023.01)

(52) U.S. Cl.
CPC .................................... *G06N 5/022* (2013.01)

(58) Field of Classification Search
CPC ...................................................... G06N 5/022
See application file for complete search history.

(56) References Cited

U.S. PATENT DOCUMENTS 7,707,129 B2 * 4/2010 Zhuang ............... G06F 18/2411 706/20
2011/0218769 A1 * 9/2011 Handa .................. G01R 33/025 702/181

(Continued)

OTHER PUBLICATIONS

Krasanakis, Emmanouil, Eleftherios Spyromitros Xioufis, Symeon Papadopoulos and Yiannis Kompatsiaris. "Adaptive Sensitive Reweighting to Mitigate Bias in Fairness-aware Classification." Proceedings of the 2018 World Wide Web Conference (2018): n. page. (Year: 2018).*

(Continued)

*Primary Examiner* — Omar F Fernandez Rivas
*Assistant Examiner* — Corey M Sackalosky
(74) *Attorney, Agent, or Firm* — DORITY & MANNING P.A.

(57) ABSTRACT

The present disclosure is directed to systems and methods for identifying and correcting label bias in machine learning via intelligent re-weighting of training examples. In particular, aspects of the present disclosure leverage a problem formulation which assumes the existence of underlying, unknown, and unbiased labels which are overwritten by an agent who intends to provide accurate labels but may have biases towards certain groups. Despite the fact that a biased training dataset provides only observations of the biased labels, the systems and methods described herein can nevertheless correct the bias by re-weighting the data points without changing the labels.

20 Claims, 5 Drawing Sheets

(56) References Cited

U.S. PATENT DOCUMENTS

| | | | | |
|---|---|---|---|---|
| 2011/0293146 | A1* | 12/2011 | Grycewicz | G06T 7/32 382/106 |
| 2011/0295722 | A1* | 12/2011 | Reisman | G06Q 30/0641 705/26.1 |
| 2017/0243336 | A1* | 8/2017 | Zou | G06T 7/30 |
| 2018/0096247 | A1* | 4/2018 | Maruhashi | G06N 3/084 |

OTHER PUBLICATIONS

Kehrenberg, T., Chen, Z., & Quadrianto, N. (2020). Tuning Fairness by Balancing Target Labels. Frontiers in artificial intelligence, 3, 33. https://doi.org/10.3389/frai.2020.00033, v1 (2018) (Year: 2018).*

Bernhard Schölkopf; John Platt; Thomas Hofmann, "Correcting Sample Selection Bias by Unlabeled Data," in Advances in Neural Information Processing Systems 19: Proceedings of the 2006 Conference , MIT Press, 2007, pp. 601-608. (Year: 2007).*

Agarwal, A., Beygelzimer, A., Dudik, M., Langford, J. & Wallach, H . . . (2018). A Reductions Approach to Fair Classification. Proceedings of the 35th International Conference on Machine Learning, in Proceedings of Machine Learning Research 80:60-69 (Year: 2018).*

Kehrenberg, T., Chen, Z., & Quadrianto, N. (2020). Tuning Fairness by Balancing Target Labels. Frontiers in artificial intelligence, 3, 33. https://doi.org/10.3389/frai.2020.00033 (Year: 2020).*

Bernhard Schölkopf; John Platt; Thomas Hofmann, "Correcting Sample Selection Bias by Unlabeled Data," in Advances in Neural Information Processing Systems 19: Proceedings of the 2006 Conference , MIT Press, 2007, pp. 601-608. (Year: 2006).*

Agarwal, A., Beygelzimer, A., Dudik, M., Langford, J. & Wallach, H . . . (2018). A Reductions Approach to Fair Classification. Proceedings of the 35th International Conference on Machine Learning, in Proceedings of Machine Learning Research 80:60-69 Available from https://proceedings.mlr.press/v80/agarwa (Year: 2018).*

Cotter et al, "Training Well-Generalizing Classifiers for Fairness Metrics and Other Data-Dependent Constraints" arXiv:1807v2, Sep. 28, 2018, 28 pages.

Jiang et al, "Identifying and Correcting Label Bias in Machine Learning", arXiv:1901v1, Jan. 15, 2019, 16 pages.

International Search Report for PCT/US2019/056445 mailed on Feb. 10, 2020, 2 pages.

Krasanakis et al, "Adaptive Sensitive Reweighting to Mitigate Bias in Fairness-Aware Classification", World Wide Web Conference, Apr. 23, 2018, New York, New York, 10 pages.

International Preliminary Report on Patentability for Application No. PCT/US2019/056445, mailed Jul. 22, 2021, 10 pages.

* cited by examiner

300

IDENTIFYING AND CORRECTING LABEL BIAS IN MACHINE LEARNING

PRIORITY CLAIM

This application is based upon and claims the right of priority under 35 U.S.C. § 371 to International Application No. PCT/US2019/056445, filed on Oct. 16, 2019, which claims priority to U.S. Provisional Patent Application No. 62/789,115 filed Jan. 7, 2019. Applicant claims priority to and the benefit of each of such applications and incorporates all such applications herein by reference in their entirety.

FIELD

The present disclosure relates generally to machine learning. More particularly, the present disclosure relates to systems and methods for identifying and correcting label bias in machine learning via intelligent re-weighting of training examples.

BACKGROUND

Machine learning has become widely adopted in a variety of applications that significantly affect various aspects of the real-world. Providing a lack of bias in these decision-making systems has thus become an increasingly important concern. It has been shown that, in some instances, without appropriate intervention during training or evaluation, models can be biased against inputs that have certain characteristics or that belong to certain subgroups of all possible types of inputs. This is due to the fact that the data used to train these models can contain biases which can become reinforced into the model.

In particular, training datasets can contain biases and it has been observed that models (e.g., machine-learned classification models) trained on such datasets can inherit these biases. Moreover, it has been shown that simple remedies, such as ignoring the features corresponding to certain subgroups, are largely ineffective due to redundant encodings in the data. In other words, the data can be inherently biased in possibly complex ways, thus making fairness of the resulting classification model difficult to enforce.

One strain of research on training classification models to satisfy notions of fairness has focused on developing post-processing steps to enforce fairness on a learned model. That is, one first trains a machine-learned model on the biased data, resulting in an unfair classifier. When the unfair classifier is used to make classifications, the outputs of the classifier are calibrated after-the-fact to enforce fairness. However, because post-processing approaches decouple the training from the fairness enforcement, they can result in a classifier which exhibits poor predictive accuracy. Furthermore, post-processing techniques require additional calibration operations to be performed on the output of the classification model following implementation of classification model. These additional calibration operations add additional complexity to the prediction process. In addition, performance of these additional calibration operations requires additional memory and processing resources to be expended in addition to implementation of the model itself. Expenditure of these additional resources can be particularly problematic in scenarios in which inference (e.g., classification) occurs in a resource-constrained environment such as, for example, a mobile device, an embedded device, or an edge device.

Another strain of work has proposed to incorporate fairness into the training algorithm itself, framing the problem as a constrained optimization problem. However, such approaches introduce undesired complexity and can be more difficult to train. In particular, constrained optimization approaches are often highly unstable during training and, in some instances, fail to converge to a workable solution. This instability can result in the need to perform many alternative rounds of training (e.g., in combination with significant amounts of manual hyperparameter tuning) in order to achieve convergence to a usable model. These additional rounds of training which result from the instability of constrained optimization approaches can require additional memory and processing resources to be expended, which is generally undesirable.

As such, neither of the approaches of post-processing and constrained optimization, which adjust the machine learning model rather than the training data, represent a natural or straightforward approach to produce an unbiased classifier. In particular, both post-processing and constrained optimization approaches can result in increased consumption of computing resources such as processing power and memory usage.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to reduce bias in a machine-learned classification model. The method includes obtaining, by one or more computing devices, a training dataset comprising a plurality of training examples. Each training example includes an example input and a respective example label applied to the example input. The example labels of the training dataset exhibit a bias against one or more subgroups of the example inputs. The method includes initializing, by the one or more computing devices, a plurality of weights that are respectively associated with the plurality of training examples. The method includes, for each of one or more training iterations, determining, by the one or more computing devices, one or more constraint violation values for the machine-learned classification model on the training dataset relative to one or more fairness constraints applied to the one or more subgroups of the example inputs. The method includes, for each of one or more training iterations, updating, by the one or more computing devices, one or more re-weighting control values respectively associated with the one or more fairness constraints based at least in part on the one or more constraint violation values. The method includes, for each of one or more training iterations, modifying, by the one or more computing devices, at least one of the plurality of weights associated with the plurality of training examples based at least in part on one or more re-weighting control values to form a plurality of modified weights. The method includes, for each of one or more training iterations, re-training, by the one or more computing devices, the machine-learned classification model using the training dataset weighted according to the plurality of modified weights.

A single re-weighting control value may be associated with at least one of the one or more fairness constraints. The one or more fairness constraints may comprise one or more of: a demographic parity constraint, a disparate impact constraint, or an equal opportunity constraint. In some implementations, both a true positive re-weighting control value and a false positive re-weighting control value are associated with at least one of the one or more fairness constraints. The one or more fairness constraints may comprise an equalized odds constraint.

Modifying, by the one or more computing devices, at least one of the plurality of weights associated with the plurality of training examples based at least in part on one or more re-weighting control values to form the plurality of modified weights may comprise determining, by the one or more computing devices, for each of plurality of weights, an intermediate weight value equal to an exponential raised to a sum of the re-weighting control values for which the corresponding example input is included in the corresponding subgroup. The intermediate weight values may be normalized for the plurality of weights to form the plurality of modified weights. Updating, by the one or more computing devices, the one or more re-weighting control values may comprise subtracting, from the one or more re-weighting control values, the one or more constraint violation values multiplied by a step size. The one or more re-weighting control values may comprise Lagrange multipliers.

Modifying, by the one or more computing devices, at least one of the plurality of weights associated with the plurality of training examples based at least in part on one or more re-weighting control values to form a plurality of modified weights may have, when a positive prediction rate of the machine-learned classification model with respect to a first subgroup of the example inputs is below a target value, a first effect of increasing the weight associated with training examples in which the corresponding example input is included in the first subgroup and the corresponding example label is a positive label and a second effect of decreasing the weight associated with training examples in which the corresponding example input is included in the first subgroup and the corresponding example label is a negative label.

In some implementations, the machine-learned classification model comprises an artificial neural network or a logistic regression classifier model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
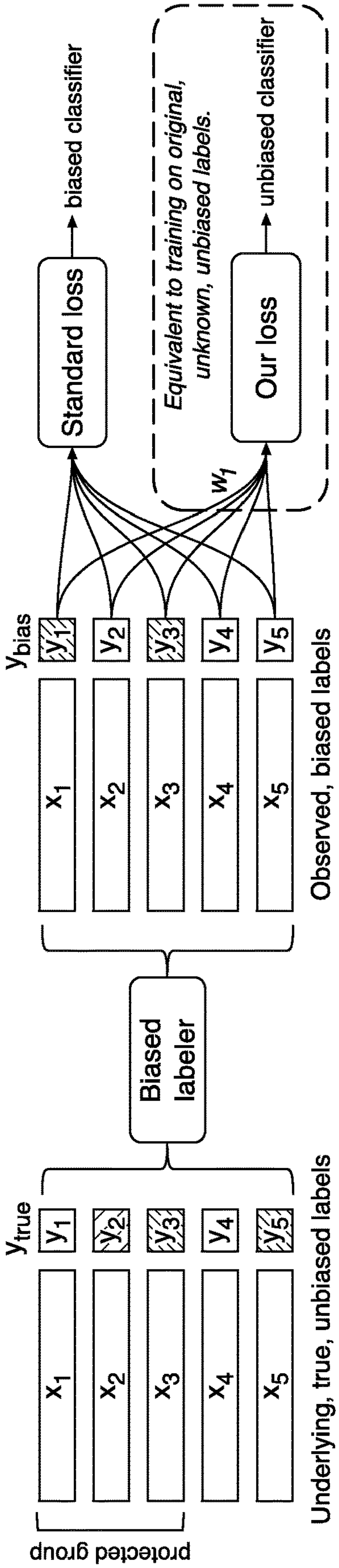
FIG. 1 depicts a graphical diagram of an example problem formulation for training an unbiased classifier according to example embodiments of the present disclosure.

Reference numerals that are repeated across plural figures are intended to identify the same features in various implementations.

DETAILED DESCRIPTION

Overview

Generally, the present disclosure is directed to systems and methods for identifying and correcting label bias in machine learning via intelligent re-weighting of training examples included in a biased training dataset. In particular, aspects of the present disclosure leverage a problem formulation which assumes the existence of underlying, unknown, and unbiased labels which are overwritten by an agent who intends to provide accurate labels but may have biases towards certain subgroups. Thus, despite the fact that a biased training dataset provides only observations of the biased labels, example implementations of the systems and methods described herein can nevertheless correct the bias by re-weighting the data points without changing the labels. Biases may arise in a training dataset through a number of mechanisms and need not arise from conscious or even subconscious decisions of human actors. For example, biases can arise naturally due to the ways in which training data is compiled (such as random sampling) and the frequencies with which certain conditions arise or are documented in a population. As such, the term bias in the present context should not be understood to mean psychological bias, but rather as describing an inherent property of the training dataset.

In particular, in one example, a computing system can obtain a training dataset that includes a plurality of training examples. Each training example can include an example input and a respective example label applied to the example input. The example labels of the training dataset can exhibit a bias against one or more subgroups of the example inputs. That is, the training dataset can be a biased training dataset, which is a common scenario encountered in a number of different machine learning problems. The training dataset may be, by way of example only, images, video, audio, other sensor data (such as lidar, radar, etc.) or text.

As one example, a training dataset might include example images and each image might include an example label that indicates whether or not the image depicts a cat. Thus, a classifier model can be trained on the training dataset to classify an input image as either depicting a cat or not depicting a cat. The example images can include different subgroups of images that exhibit different features such as, as an example, subgroups of images according to different color spaces such as RGB images, HSV images, CMYK images, and grayscale images. However, due to error or bias introduced by the entity that performed the labeling of the training dataset, the training dataset may exhibit bias against a certain subgroup of the example images. As an example, certain CMYK images that do in fact depict a cat may have corresponding labels that indicate that the image does not depict a cat. Thus, the training dataset can exhibit a bias against a certain subgroup of images (e.g., CMYK images) which can manifest itself as a number of labels which do not in fact reflect the underlying ground-truth. If left unaddressed, the classification model trained on the training dataset can inherit the bias exhibited by the training dataset. That is, in the particular example given above, if the bias in the training data is not addressed, the resulting classification model may exhibit a true positive rate on new CMYK input images that is less than if the classifier had been trained on the true underlying labels.

As another example, a classification model may be incorporated into other systems, such as a reinforcement learning system in which an agent interacts with an environment by performing actions that are selected by the reinforcement learning system in response to receiving sensor inputs that characterize the current state of the environment. The reinforcement learning system may include a classifier having a classification model trained according to techniques described herein and use the classifier to process received sensor inputs. As an example only, a reinforcement learning system may receive as input an observation, classify the observation, and use the classification to generate an action such as a control signal for a machine, for example for a scanner, a vehicle or to control the joints of a mechanical agent such as a robot. Classification models processed in accordance with the techniques described herein may be incorporated into other systems or machines that receive sensor input and process that sensor input.

An example machine may be one that is used in a clinical or medical setting, such as a medical scanner or surgical robot. It will be appreciated that biases in classification training data may arise in medical training data due to differences in the way that some conditions manifest in certain population subgroups compared to others, or due to the frequency with which conditions occur, or are seen/identified by clinicians, for certain population subgroups. By training the classification model in accordance with the techniques described herein, agents may process medical data with reduced bias.

In other examples, the training examples may be text, audio such as spoken utterances, or video, or atomic position and/or connection data, and the training classification model may output a score or classification for this data. Thus a classification model processed in accordance with the techniques described herein may be part of: a speech synthesis system; an image processing system, a video processing system; a dialogue system; an autocompletion system; a text processing system; and/or a drug discovery system.

According to an aspect of the present disclosure, to correct for bias in a training dataset, the computing system can perform a technique by which a plurality of weights that are respectively associated with the plurality of training examples can be re-weighted (e.g., iteratively re-weighted) in order to learn a machine-learned classification model that satisfies one or more fairness constraints.

Example fairness constraints include demographic parity, disparate impact, equal opportunity, and equalized odds. Each of these example fairness constraints is described in detail in the sections that follow. Each fairness constraint can be evaluated relative to a defined subgroup of possible input values (e.g., a subgroup of the possible input values that exhibit a certain feature value for a particular feature).

More particularly, for each of one or more training iterations, the computing system can determine one or more constraint violation values for the machine-learned classification model on the training dataset relative to one or more fairness constraints applied to the one or more subgroups of the example inputs. Each constraint violation value can describe whether and to what extent a performance of the machine-learned classification model on the training data violates a corresponding fairness constraint.

At each iteration, after determining the one or more constraint violation values for the one or more fairness constraints, the computing system can update one or more re-weighting control values respectively associated with the one or more fairness constraints based at least in part on the one or more constraint violation values. As one example, in some implementations, updating each re-weighting control value can include subtracting the respective constraint violation value multiplied by a step-size (e.g., a fixed or dynamic step-size) from the current re-weighting control value.

In some implementations, the one or more re-weighting control values can be derived based on the problem formulation described above, which models a relationship between an underlying but unknown unbiased label function $y_{true}$ and a biased label function $y_{bias}$ that has produced the training dataset. FIG. 1 provides an example graphical diagram that illustrates this approach. As illustrated in FIG. 1, the proposed approach to training an unbiased, fair classifier assumes the existence of true but unknown label function which has been adjusted by a biased process to produce the labels observed in the training data. The present disclosure provides a procedure that appropriately weights examples in the dataset. Training on the resulting (re-weighted) loss corresponds to training on the original, true, unbiased labels.

In particular, in some implementations, a divergence between the unbiased label function $y_{true}$ and the biased label function $y_{bias}$ can be measured using KL-divergence. Use of KL-divergence enables derivation of a closed form expression that expresses the biased label function $y_{bias}$ in terms of the unbiased label function $y_{true}$ in combination with one or more re-weighting control values (e.g., see Proposition 1 below) and vice verso. In one example, the one or more re-weighting control values can be Lagrange multipliers. The re-weighting control values can control the re-weighting process by which the respective weights assigned to training examples are modified to counteract for the bias within the training dataset.

In some instances, only a single re-weighting control value is associated with at least some of the fairness constraints. For example, in some implementations, a single re-weighting control value can be associated with each instance of a demographic parity constraint, a disparate impact constraint, or an equal opportunity constraint. In some instances, both a true positive re-weighting control value and a false positive re-weighting control value are associated with at least some of the fairness constraints. For example, both a true positive re-weighting control value and a false positive re-weighting control value can be associated with an equalized odds constraint.

At each iteration, after updating the one or more re-weighting control values based on the observed constrained violations, the computing system can modify at least one of the plurality of weights associated with the plurality of training examples based at least in part on the one or more re-weighting control values to form a plurality of modified weights. For example, the computing system can compute the weight for each training example based on the re-weighting control values and according to the closed form expression that expresses the biased label function $y_{bias}$ in terms of the unbiased label function $y_{true}$ in combination with one or more re-weighting control values.

In some implementations, modifying the plurality of weights associated with the plurality of training examples based at least in part on one or more re-weighting control values can include determining, for each of plurality of weights, an intermediate weight value equal to an exponential raised to a sum of the re-weighting control values for which the corresponding example input is included in the corresponding subgroup; and normalizing the intermediate weight values for the plurality of weights to form the plurality of modified weights.

Referring again to the iterative re-weighting technique, at each iteration, after forming the plurality of modified weights, the computing system can re-train the machine-learned classification model using the training dataset weighted according to the plurality of modified weights. The computing system can perform iterations until a stopping condition is met, such as, for example, satisfactory performance of the classification model on all of the applied fairness constraints.

To provide a more intuitive explanation, example implementations of the re-weighting scheme described herein apply the following logic: if the positive prediction rate for a certain subgroup of interest is lower than the overall positive prediction rate, then the corresponding re-weighting control value should be increased. In particular, if the weights of positively labeled examples included in the subgroup are increased and the weights of the negatively labeled examples included in the subgroup are decreased, then this will encourage the classification model to increase its accuracy on the positively labeled examples included in the subgroup, while the accuracy on the negatively labeled examples of the subgroup may fall. Either of these two events will cause the positive prediction rate on the subgroup of interest to increase, and thus bring the classification model closer to the true, unbiased label function.

To provide an example, if the positive prediction rate for CMYK images is lower than the overall positive prediction rate for the other color spaces (and assuming a uniform distribution of true positives among the different color spaces), then increasing the weights of positively labeled CMYK image examples and/or decreasing the weights of negatively labeled CMYK image examples will result in increasing the positive prediction rate of the classifier on CMYK images, thereby moving closer to the true, unbiased labels.

In addition, for other fairness constraints which focus on true positive and false positive rates, similar logic can be applied, including, for example, to increase the true positive rate of the subgroup, increasing the weight of positively labeled examples included in the subgroup; and, to decrease the false positive rate of the subgroup, increasing the weight of negatively labeled examples included in the subgroup.

Furthermore, opposite re-weighting directions as those described above can provide opposite effects (e.g., down-weighting positively labeled examples can reduce positive prediction rate). Likewise, for certain fairness constraints, down-weighting negatively labeled examples may have the same general effect as up-weighting positively labeled examples, and vice versa. Thus, various implementations of the present disclosure can selectively re-weight training examples (e.g., through the use of re-weighting control values as described herein) to push the classification model towards the true, unbiased label function, thereby satisfying various fairness constraints.

Example experiments conducted on example implementations of the systems and methods described herein have shown, with theoretical guarantees, that training on the re-weighted dataset corresponds to training on the unobserved but unbiased labels, thus leading to an unbiased machine learning classifier. The proposed procedure is fast and robust, can be used with virtually any learning algorithm, and has been experimentally shown to outperform standard approaches in achieving unbiased classification.

Example experimental results are included in the Appendix to U.S. Provisional Patent Application No. 62/789,115, which is fully incorporated into and forms a portion of the present disclosure.

Thus, the present disclosure provides systems and methods that address the underlying data bias problem directly. The present disclosure introduces a new framework for fairness that assumes that there exists an unknown but unbiased ground truth label function and that the labels observed in the data are assigned by an agent who is possibly biased, but otherwise has the intention of being accurate. This assumption is natural in practice and it can also be applied to settings where the features themselves are biased and the observed labels were generated by a process depending on the features (e.g., situations where there is bias in both the features and labels).

Based on this formulation, the systems and methods of the present disclosure can identify the amount of bias in the training data and correct this bias by assigning appropriate weights to each example in the training data. The present disclosure demonstrates, with theoretical guarantees, that training the classification model under the resulting weighted objective leads to an unbiased classifier on the original un-weighted dataset. In particular, in some implementations, the proposed methods do not modify any of the assigned labels and features, but rather correct for the bias by changing the distribution of the sample points via the re-weighted data.

The proposed techniques are practical, being able to efficiently correct the bias in a dataset and being simple to tune. Moreover, they can be applied to various notions of fairness, including demographic parity, equal opportunity, equalized odds, and disparate impact. After the method assigns appropriate weights, any off-the-shelf classification procedure can be used on the weighted dataset to learn a fair classifier.

The systems and methods of the present disclosure provide a number of technical effects and benefits. As one example technical effect and benefit, as compared to post-processing techniques, the systems and methods of the present disclosure do not require additional operations to be conducted at inference time in order to correct for bias. In particular, post-processing techniques require additional calibration operations to be performed on the output of the classification model following implementation of classification model. These additional calibration operations add additional complexity to the prediction process. In addition, performance of these additional calibration operations requires additional memory and processing resources to be expended in addition to implementation of the model itself. Expenditure of these additional resources can be particularly problematic in scenarios in which inference occurs in a resource-constrained environment such as, for example, a mobile device, an embedded device, or an edge device. In contrast to these post-processing techniques, the systems and methods of the present disclosure enable an unbiased classification model to be learned. That is, the outputs of the classification model are unbiased and do not require additional calibration operations. Thus, the present disclosure provides classification models which provide unbiased results using reduced resource consumption at inference time. This can be particularly beneficial when inference is performed (e.g., the classification model is implemented) in a resource-constrained environment such as, for example, a mobile device, an embedded device, or an edge device, where even small savings in resources can be critical over the lifespan of the device.

As another example technical effect and benefit, as compared to constrained optimization techniques, the systems and methods of the present disclosure exhibit superior stability at the training stage. In particular, constrained optimization approaches are often highly unstable during training and, in some instances, fail to converge to a workable solution. This instability can result in the need to perform many alternative rounds of training (e.g., in combination with significant amounts of manual hyperparameter tuning) in order to achieve convergence to a usable model. These additional rounds of training which result from the instability of constrained optimization approaches can require additional memory and processing resources to be expended, which is generally undesirable. In contrast to these constrained optimization techniques, the systems and methods of the present disclosure are generally stable at training time and therefore, result in much fewer instances in which the training fails to converge, where each of these instances consumes resources but fails to produce usable results. Thus, the stability and reduced need for tuning provided by the present disclosure can reduce resource consumption needed to train a fair classifier.

As yet another example technical effect and benefit, the systems and methods of the present disclosure can enable an unbiased classification model to be learned from biased training data. Thus, the systems and methods of the present disclosure enable a computing system to identify and counteract bias in training data when training a classification model, which represents an improvement to the computing system itself.

Example Notions of Bias and Fairness

This section introduces example aspects of the proposed new framework for machine learning fairness, which explicitly assumes an unknown and unbiased ground truth label function. Notation and definitions used in the subsequent presentation of the example methods are also introduced.

Example Biased and Unbiased Labels

Consider a data domain X and an associated data distribution $\mathcal{P}$. An element $x \in X$ may be interpreted as a feature vector associated with a specific example. Let $\mathcal{Y} := \{0,1\}$ be the labels, considering the binary classification setting, although the proposed methods are equally applicable to other settings. Assume the existence of an unbiased, ground truth label function $y_{true}$: $\mathcal{X} \rightarrow [0,1]$. Although $y_{true}$ is the assumed ground truth, in general it is not accessible. Rather, the dataset is labelled according to a biased label function $y_{bias}: X \rightarrow [0,1]$. Accordingly, assume that the data is drawn as follows:

$$(x, y) \sim \mathcal{D} \equiv x \sim \mathcal{P},\ y \sim \text{Bernoulli}(y_{bias}(x)).$$

and assume access to a finite sample $$\mathcal{D}_{[n]} := \{(x^{(i)}, y^{(i)})\}_{i=1}^{n}$$

drawn from $\mathcal{D}$.

In a machine learning context, one objective is to use the dataset $\mathcal{D}$ to recover the unbiased, true label function $y_{true}$. In general, the relationship between the desired $y_{true}$ and the observed $y_{bias}$ is unknown. Without additional assumptions, it is difficult to learn a machine learning model to fit $y_{true}$. Aspects of the present disclosure attack this problem by proposing a minimal assumption on the relationship between $y_{true}$ and $y_{bias}$. The assumption allows derivation of a tractable training procedure for learning $y_{true}$ using only access to data labelled according to $y_{bias}$.

Note that the proposed perspective on the problem of learning a fair machine learning model is conceptually different from previous ones. While previous perspectives propose to train on the observed, biased labels and only enforce fairness as a constraint on or post-processing step to the learning process, the systems and methods proposed herein take a more direct approach. Training on biased data can be inherently misguided, and thus the proposed perspective is more appropriate and better aligned with the directives associated with machine learning fairness.

Example Notions of Bias

This section discusses example precise ways in how $y_{bias}$ can be biased. It describes a number of example accepted notions of fairness; i.e., what it means for an arbitrary label function or machine learning model $h: X \rightarrow [0,1]$ to be biased (unfair) or unbiased (fair).

In some instances, the notions of fairness can be defined in terms of a constraint function $c: X \times \mathcal{Y} \rightarrow \mathbb{R}$. Many of the common notions of fairness may be expressed or approximated as linear constraints on h. That is, they are of the form $$\mathbb{E}_{x \sim \mathcal{P}}[\langle h(x), c(x) \rangle] = 0,$$

where $$\langle h(x), c(x) \rangle := \sum_{y \in \mathcal{Y}} h(y \mid x) c(x, y)$$

and the shorthand $h(y|x)$ denotes the probability of sampling y from a Bernoulli random variable with $p=h(x)$; i.e., $h(1|x) := h(x)$ and $h(0|x) := 1-h(x)$. Therefore, a label function h is unbiased with respect to the constraint function c if $\mathbb{R}[\langle (h(x), c(x) \rangle] = 0$. If h is biased, the degree of bias (positive or negative) is given by $\mathbb{E}_{x \sim \mathcal{P}}[\langle h(x), c(x) \rangle]$.

In some instances, the notions of fairness can be defined with respect to a protected group $\mathcal{G} \subseteq X$, and thus access to an indicator function $g(x) = [x \in \mathcal{G}]$ can be assumed. The expression $Z_{\mathcal{G}} := \mathbb{E}_{x \sim \mathcal{P}}[g(x)]$ can be used to denote the probability of a sample drawn from $\mathbb{R}$ to be in $\mathcal{G}$. The expression $P_X = \mathbb{E}_{x \sim \mathcal{P}}[y_{true}(x)]$ can be used to denote the proportion of X which is positively labelled and in $P_{\mathcal{G}} = \mathbb{E}_{x \sim \mathcal{P}}[g(x) \cdot y_{true}(x)]$ to denote the proportion of X which is positively labelled and in $\mathcal{G}$. The following are some examples of accepted notions of constraint functions:

Demographic parity: A fair classifier h should make positive predictions on $\mathcal{G}$ at the same rate as on all of X. The constraint function may be expressed as $c(x, 0)=0$, $c(x, 1)=g(x)/Z_{\mathcal{G}}-1$.

Disparate impact: This is identical to demographic parity, only that, in addition, the classifier does not have access to the features of x indicating whether the sample belongs to the protected group.

Equal opportunity: A fair classifier h should have equal true positive rates on $\mathcal{G}$ as on all of X. The constraint may be expressed as $c(x, 0)=0$, $c(x, 1)=g(x)y_{true}(x)/P_{\mathcal{G}} - y_{true}(x)/P_{\mathcal{X}}$ Equalized odds: A fair classifier h should have equal true positive and false positive rates on $\mathcal{G}$ as on all of X. In addition to the constraint associated with equal opportunity, this notion applies an additional constraint with c(x, 0)=0, c(x, 1)=g(x)(1−$y_{true}$(x))/($Z_{\mathcal{G}}-P_{\mathcal{G}}$)−(1−$y_{true}$(x))/(1−$P_X$).

In practice, there are often multiple fairness constraints $$\{c_k\}_{k=1}^K$$

associated with multiple protected groups $$\{\mathcal{G}_k\}_{k=1}^K.$$

The subsequent discussion and results assume multiple fairness constraints and protected groups, and that the protected groups may have overlapping samples.

Example Modeling how Bias Arises in Data

This section introduces example aspects of the proposed underlying mathematical framework to understand bias in the data, by providing the relationship between $y_{bias}$ and $y_{true}$ (Assumption 1 and Proposition 1). This allows derivation of a closed form expression for $y_{true}$ in terms of $y_{bias}$ (Corollary 1). The following section shows how this expression leads to a simple weighting procedure that uses data with biased labels to train a classifier with respect to the true, unbiased labels.

Begin with an assumption on the relationship between the observed $y_{bias}$ and the underlying $y_{true}$.

Assumption 1: Suppose that the fairness constraints are $c_1, \ldots, c_K$, with respect to which $y_{true}$ is unbiased (i.e. $\mathbb{E}_{x\sim\mathcal{P}}[\langle y_{true}(x), c_k(x)\rangle]=0$ for k∈[K]). Assume that there exist $\epsilon_1, \ldots, \epsilon_K \in \mathbb{R}$ such that the observed, biased label function $y_{bias}$ is the solution of the following constrained optimization problem:

$$\arg\min_{\hat{y}:\mathcal{X}\to[0,1]} \mathbb{E}_{x\sim\mathcal{P}}[D_{KL}(\hat{y}(x)\|y_{true}(x))]$$
$$\text{s.t. } \mathbb{E}_{x\sim\mathcal{P}}[\langle \hat{y}(x), c_k(x)\rangle] = \epsilon_k$$
$$\text{for } k = 1, \ldots, K,$$

where $D_{KL}$ is used to denote the KL-divergence.

In other words, assume that $y_{bias}$ is the label function closest to $y_{true}$ while achieving some amount of bias, where proximity to $y_{true}$ is given by the KL-divergence. This is a reasonable assumption in practice, where the observed data may be the result of manual labelling done by actors (e.g., human decision-makers) who strive to provide an accurate label while being affected by (potentially unconscious) biases; or in cases where the observed labels correspond to a process (e.g., results of a written exam) devised to be accurate and fair, but which is nevertheless affected by inherent biases.

The KL-divergence is used to impose this desire to have an accurate labelling. In general, a different divergence may be chosen. However, the choice of a KL-divergence allows derivation of the following proposition, which provides a closed-form expression for the observed $y_{bias}$.

Proposition 1: Suppose that Assumption 1 holds. Then $y_{bias}$ satisfies the following for all x∈X and y∈$\mathcal{Y}$.

$$y_{bias}(y\mid x) \propto y_{true}(y\mid x)\cdot\exp\left\{-\sum_{k=1}^{K}\lambda_k\cdot c_k(x, y)\right\}$$

for some $\lambda_1, \ldots, \lambda_K \in \mathbb{R}$.

Given this form of $y_{bias}$ in terms of the true label function $y_{true}$ the form of $y_{true}$ can be deduced in terms of $y_{bias}$:

Corollary 1: Suppose that Assumption 1 holds. The unbiased label function $y_{true}$ is of the form $$y_{true}(y\mid x) \propto y_{bias}(y\mid x)\cdot\exp\left\{\sum_{k=1}^{K}\lambda_k c_k(x, y)\right\},$$

for some $\lambda_1, \ldots, \lambda_K \in \mathbb{R}$.

Example Techniques for Learning Unbiased Labels

The previous section derived a closed form expression for the true, unbiased label function $y_{true}$ in terms of the observed label function $y_{bias}$, coefficients $\lambda_1, \ldots, \lambda_K$, and constraint functions $c_1, \ldots, c_K$. This section elaborates on how one may learn a machine learning model h to fit $y_{true}$, given access to a dataset $\mathcal{D}$ with labels sampled according to $y_{bias}$. The discussion begins by restricting to constraints $c_1, \ldots, c_K$ associated with demographic parity, allowing full knowledge of these constraint functions. Further portions of this section will show how the same method may be extended to general notions of fairness.

Since the functions $c_1, \ldots, c_K$ are known, learning only requires determining the coefficients $\lambda_1, \ldots, \lambda_K$ and the classifier it. This section will first show how a classifier h may be learned assuming knowledge of the coefficients $\lambda_1, \ldots, \lambda_K$. This section will subsequently show how the coefficients themselves may be learned, thus allowing the algorithm to be used in general settings. The resulting example algorithm simultaneously minimizes the weighted loss and maximizes fairness via learning the coefficients, which may be interpreted as competing goals with different objective functions. Thus, it is a form of a non-zero-sum two-player game.

Example Techniques for Learning h Given $\lambda_1, \ldots, \lambda_K$

Although the closed form expression $y_{true}(y|x) \propto y_{bias}(y|x)$ exp $$\left\{\sum_{k=1}^{K}\lambda_1 c_k\right\}$$

is provided for the true label function, in practice the values $y_{bias}(y|x)$ are not accessible but rather only access is only available to data points with labels sampled from $y_{bias}(y|x)$. The present disclosure proposes example weighting techniques to train h on labels based on $y_{true}$. One example weighting technique weights an example (x, y) by the weight w(x, y)=$\tilde{w}$(x, y)/$\sum_{y'\in\mathcal{Y}}\tilde{w}(x, y')$, where $$\tilde{w}(x, y') = \exp\left\{\sum_{k=1}^{K}\lambda_k c_k(x, y')\right\}.$$

Another example weighting technique—the sampling technique—is based on a coin-flip. For the sampling technique, note that the distribution $P(Y=y)\propto y_{bias}(y|x)\cdot$ $$\exp\left\{\sum_{k=1}^{K}\lambda_h c_k(x,y)\right\}$$

corresponds to the conditional distribution P (A=y and B=y|A=B), where A is a random variable sampled from $y_{bias}(y|x)$ and B is a random variable sampled from the distribution $P(B=y)\propto\exp$ $$\left\{\sum_{k=1}^{K}\lambda_k c_k(x,y)\right\}.$$

Therefore, in some example training procedures for h, given a data point (x, y)~D, where y is sampled according to $y_{bias}$ (i.e., A), the computing system can sample a value y' from the random variable B, and train h on (x, y) if and oily if y=y'. This procedure corresponds to training h on data points (x, y) with y sampled according to the true, unbiased label function $y_{true}$ (x). The sampling technique can ignore or skip data points when A≠B (i.e., when the sample from P(B=y) does not match the observed label). In cases where the cardinality of the labels is large, this technique may ignore a large number of examples, hampering training. For this reason, the weighting technique may be more practical in certain scenarios.

The following theorem states that training a classifier on examples with biased labels weighted by w(x, y) is equivalent to training a classifier on examples labelled according to the true, unbiased labels.

Theorem 1: Training a classifier h on the weighted objective $\mathbb{E}_{x\sim\mathcal{P},y\sim y_{bias}(x)}[w(x,y)\cdot\ell h(x),y)]$ is equivalent to training the classifier on the objective $\mathbb{E}_{x\sim\tilde{\mathcal{P}},y\sim y_{true}(x)}[\ell(h(x),y)]$ with respect to the underlying, true labels.

Proof. For a given x and for any $y\in\mathcal{Y}$, due to Corollary 1 we have, $$\tilde{w}(x,y')=\exp\left\{\sum_{k=1}^{K}\lambda_k c_k(x,y')\right\}.$$

where $\phi(x)\sum_{y'\in\mathcal{Y}}w(x,y)y_{bias}(y|x)$ only depends on x. Therefore, training a classifier h using this weighting corresponds to training h on data points (x, y) with y sampled according to the true, unbiased label function $y_{true}(x)$, while changing the distribution over x to $\tilde{\mathcal{P}}(x)\propto\phi(x)\mathcal{P}(x)$. End proof.

Theorem 1 is a core contribution of the present disclosure. It states that the bias in observed labels may be corrected in a very simple and straightforward way: Just re-weight the training examples. Note that Theorem 1 suggests that when one re-weights the training examples, one trades off the ability to train on unbiased labels for training on a slightly different distribution P over features x. In the next section it will be shown that, given some mild conditions, the change in feature distribution does not affect the final learned classifier. Therefore, in these cases, training with respect to weighted examples with biased labels is equivalent to training with respect to the same examples and the true labels.

Example Techniques for Determining the Coefficients $\lambda_1, \ldots, \lambda_K$ This subsection continues to describe how to learn the coefficients $\lambda_1, \ldots, \lambda_K$. One advantage of the proposed approach is that, in practice, K is often small. Thus, the present disclosure proposes to iteratively learn the coefficients so that the final classifier satisfies the desired fairness constraints either on the training data or on a validation set. This subsection first discusses how to do this for demographic parity and the next subsection will discuss extensions to other notions of fairness. See the full pseudocode for learning h and $\lambda_1, \ldots, \lambda_K$ in Algorithm 1 below.

Intuitively, the idea is that if the positive prediction rate for a protected class 9 is lower than the overall positive prediction rate, then the corresponding coefficient should be increased; i.e., if we increase the weights of the positively labeled examples of g and decrease the weights of the negatively labeled examples of $\mathcal{G}$, then this will encourage the classifier to increase its accuracy on the positively labeled examples in $\mathcal{G}$, while the accuracy on the negatively labeled examples of $\mathcal{G}$ may fall. Either of these two events will cause the positive prediction rate on $\mathcal{G}$ to increase, and thus bring h closer to the true, unbiased label function.

Accordingly, Algorithm 1 works by iteratively performing the following steps: (1) evaluate the demographic parity constraints; (2) update the coefficients by subtracting the respective constraint violation multiplied by a fixed step-size; (3) compute the weights for each sample based on these multipliers using the closed-form provided by Proposition 1; and (4) retrain the classifier given these weights.

Algorithm 1 takes in a classification procedure H, which given a dataset $$D_{[n]}:=\{(x_i,y_i)\}_{i=1}^{n}$$

and weights $$\{w_i\}_{i=1}^{n},$$

outputs a classifier. In practice, H can be any training procedure which minimizes a weighted loss function over some parametric function class (e.g. logistic regression).

Example Algorithm 1: Training a Fair Classifier for Demographic Parity, Disparate Impact, or Equal Opportunity.

Inputs: Learning rate $\eta$, number of loops T, training data $\mathcal{D}_{[n]}=\{(x_i,y_i)\}_{i=1}^{N}$, classification procedure H. constraints $c_1, \ldots, c_K$ corresponding to protected groups $\mathcal{G}_1, \ldots, \mathcal{G}_K$.

1. Initialize $\lambda_1, \ldots, \lambda_K$ to 0 and $w_{1+=w2}=\ldots=w_n=1$.

2. Let $h:=H(\mathcal{D}_{[n]},\{w_i\}_{i=1}^{n})$

-continued

```
for t = 1, . . . , T do
    let Δ_k := E_{x~D[n]} [<h(x), c_k(x)>] for k ∈ [K].
    Update λ_k = λ_k − η · Δ_k for k ∈ [K].
    Let w̃_i := exp(Σ_{k=1}^{K} λ_k · [x ∈ G_k]) for i ∈ [n]
    Let w_i = w̃_i/(1 + w̃_i) if y_i = 1. otherwise w_i = 1/(1 + w̃_i) for i ∈ [n]
    Update h = H(D_[n], {w_i}_{i=1}^{n})
end for
Return h
```

Example Extension to Other Notions of Fairness

The initial restriction to demographic parity was made so that the values of the constraint functions $c_1, \ldots, c_K$ on any $x \in X$, $y \in \mathcal{Y}$ would be known. Note that Algorithm 1 works for disparate impact as well: The only change would be that the classifier does not have access to the protected attributes.

However, in other notions of fairness, such as equal opportunity or equalized odds, the constraint functions depend on $y_{true}$, which is unknown. For these cases, example implementations of the present disclosure approximate the unknown constraint function c(x, y) as d(g(x), y), where $d:\{0,1\}\times\mathcal{Y}\to\mathbb{R}$ is unknown. This approximation is useful, as it allows the proposed methods to treat d(g(x), y) as an additional set of parameters; one for each protected group attribute $g(x)\in\{0,1\}$ and each label $y\in\mathcal{Y}$. These additional parameters may be learned in the same way the coefficients are learned. In some cases, their values may be wrapped into the unknown coefficients. For example, for equalized odds, the unknown values for $\lambda_1, \ldots, \lambda_K$ and $d_1, \ldots, d_K$, may instead be treated as unknown values for $$\lambda_1^{TP}, \ldots, \lambda_K^{TP}, \lambda_1^{FP}, \ldots, \lambda_K^{FP};$$

i.e., separate coefficients for positively and negatively labelled points.

Further note that in practice, for fairness metrics that require the labels (such as equal opportunity and equalized odds), the goal is often to show that these fairness constraints hold relative to the observed labels, rather than the unobserved ground truth. Example extensions of the proposed algorithm to these situations are as follows:

Equal Opportunity: In fact, Algorithm 1 can be directly used by replacing the demographic parity constraints with equal opportunity constraints. Recall that in equal opportunity, the goal is for the positive prediction rates on the positively labeled examples of the protected group g to match that of the overall. If the positive prediction rate for positively labeled examples g is less than that of the overall, then Algorithm 1 will up-weight the examples of g which are positively labeled. This encourages the classifier to be more accurate on the positively labeled examples of $\mathcal{G}$, which in other words means that it will encourage the classifier to increase its positive prediction rate on these examples, thus leading to a classifier satisfying equal opportunity. Note that in practice, the algorithm does not have access to the true labels function, so the constraint violation $\mathbb{E}_{x\sim\mathcal{D}_{[n]}}[\mathbb{E}_{x\sim\mathcal{D}_{[n]}} h(x), c_k(x)\rangle]$ can be approximated using the observed labels as $\mathbb{E}_{(x,y)\sim\mathcal{D}_{[n]}}[h(x)\cdot c_k(x, y)]$.

Equalized Odds: Recall that equalized odds requires that the conditions for equal opportunity (regarding the true positive rate) to be satisfied and in addition, the false positive rates for each protected group match the false positive rate of the overall. Thus, as before, for each true positive rate constraint, if the examples of $\mathcal{G}$ have a lower true positive rate than the overall, then up-weighting positively labeled examples in $\mathcal{G}$ will encourage the classifier to increase its accuracy on the positively labeled examples of $\mathcal{G}$, thus increasing the true positive rate on $\mathcal{G}$. Likewise, if the examples of $\mathcal{G}$ have a higher false positive rate than the overall, then up-weighting the negatively labeled examples of $\mathcal{G}$ will encourage the classifier to be more accurate on the negatively labeled examples of $\mathcal{G}$, thus decreasing the false positive rate on $\mathcal{G}$. This forms the intuition behind Algorithm 2 provided further below. Again the constraint violation $$\mathbb{E}_{x\sim\mathcal{D}_{[n]}}\left[\left\langle h(x), c_k^A(x)\right\rangle\right]$$

is approximated using the observed labels as $$\mathbb{E}_{(x,y)\sim\mathcal{D}_{[n]}}\left[h(x)\cdot c_k^A(x, y)\right] \text{ for } A\in\{TP, FP\}.$$

More general constraints: It is clear that the proposed strategy can be further extended to any constraint that can be expressed as a function of the true positive rate and false positive rate over any subsets (e.g., protected groups) of the data. Examples that arise in practice include equal accuracy constraints, where the accuracy of certain subsets of the data must be approximately the same in order to not disadvantage certain groups, and high confidence samples, where there are a number of samples which the classifier ought to predict correctly and thus appropriate weighting can enforce that the classifier achieves high accuracy on these examples.

Example Algorithm 2: Training a Fair Classifier for Equalized Odds.

---

Inputs: Learning rate $\eta$, number of loops T, training data $\mathcal{D}_{[n]} = \{(x_i, y_i)\}_{i=1}^{N}$, classification procedure H. True positive rate constraints $c_1^{TP}, \ldots, c_K^{TP}$ and false positive rate constraints $c_1^{FP}, \ldots, c_K^{FP}$ respectfully corresponding to protected groups $\mathcal{G}_1, \ldots, \mathcal{G}_K$.

1. Initialize $\lambda_1^{TP}, \ldots, \lambda_K^{TP}, \lambda_1^{FP}, \ldots, \lambda_K^{FP}$ to 0 and $w_1 = w_2 = \cdots = w_n = 1$.
2. Let $h := H(\mathcal{D}_{[n]}, \{w_i\}_{i=1}^{n})$
3. for t = 1, . . . , T do
4. Let $\Delta_k^A := \mathbb{E}_{x\sim\mathcal{D}_{[n]}}\left[\langle h(x), c_k^A(x)\rangle\right]$ for $k \in [K]$ and $A \in \{TP, FP\}$.
5. Update $\lambda_k^A - \eta\cdot\Delta_k^A$ for $k \in [K]$ and $A \in \{TP, FP\}$.
6. $\tilde{w}_i^T := \exp\left(\sum_{k=1}^{K}\lambda_k^{TP}\cdot[x \in \mathcal{G}_k]\right)$ for $i \in [n]$.
7. $\tilde{w}_i^F := \exp\left(-\sum_{k=1}^{K}\lambda_k^{FP}\cdot[x \in \mathcal{G}_k]\right)$ for $i \in [n]$.
8. Let $w_i = \tilde{w}_i^T/(1+\tilde{w}_i^T)$ if $y_i = 1$, otherwise $w_i = \tilde{w}_i^F/(1.+\tilde{w}_i^T)$ for $i \in [n]$
9. Update $h = H(\mathcal{D}_{[n]}, \{w_i\}_{i=1}^{n})$
10. end for
11. Return h

---

Example Theoretical Analysis

This section provides example theoretical guarantees on a learned classifier h using the weighting technique. The goal is to show that for demographic parity, with the Lagrange multipliers that satisfy Proposition 1, training on the re-weighted dataset leads to a finite-sample non-parametric bound on the bias if the classifier has sufficient flexibility.

The following regularity assumption is made on the data distribution, which assumes that the data is supported on a compact set in $\mathbb{R}^D$ and $y_{bias}$ is smooth (i.e. Lipschitz).

Assumption 2: X is a compact set over $\mathbb{R}^D$ and $y_{bias}(x)$ is L-Lipschitz (i.e. $|y_{bias}(x)-y_{bias}(x')|\leq L\cdot|x-x'|$).

Theorem 2: (Demographic Parity) Let $0<\delta<1$. Let $$\mathcal{D}_{[n]} := \{(x_i, y_i)\}_{i=1}^{n}$$

be a sample drawn from $\mathcal{D}$. Suppose that Assumptions 1 and 2 hold. Let $\mathcal{H}$ be the set of all 2 L-Lipschitz functions mapping X to [0,1]. Suppose that the protected groups are $\mathcal{G}_1, \ldots, \mathcal{G}_K$ and the corresponding Lagrange multipliers satisfying Proposition 1 on the finite sample $D_{[n]}$ are $\lambda_1, \ldots, \lambda_K$, where $-\Lambda\leq\lambda_k\leq\Lambda$ for k=1, . . . , K and some $\Lambda>0$. Let h' be the optimal function in $\mathcal{H}$ under the weighted mean square error objective, where the weights satisfy Proposition 1. Then there exists $C_0$ depending on $\mathcal{D}$ such that for n sufficiently large depending on $\mathcal{D}$, we have with probability at least $1-\delta$:

$$\sup_{k\in[K]} |\mathbb{E}_n[h^*(x)] - \mathbb{E}_n[h^*(x) \mid x \in \mathcal{G}_k]| \leq C_0 \cdot \log(2/\delta)^{1/(2+D)} \cdot n^{-1/(4+2D)},$$

where $\mathbb{E}_n$ denotes the expectation over $\mathcal{D}_{[n]}$.

Thus, with the appropriate values of $\lambda_1, \ldots, \lambda_K$ given by Proposition 1, training with the weighted dataset based on these values will guarantee that the final classifier will be approximately unbiased. However, the above rate has a dependence on the dimension D, which may be unattractive in high-dimensional settings. However, if the data lies on a d-dimensional submanifold, then Theorem 3 below says that without any changes to the procedure, a rate that depends on the manifold dimension and independent of the ambient dimension will be enjoyed. Interestingly, these rates are attained without knowledge of the manifold or its dimension.

Theorem 3: (Demographic Parity on Manifolds) Suppose that all of the conditions of Theorem 2 hold and that in addition, X is a d-dimensional Riemannian submanifold of $\mathbb{R}^D$ with finite volume and finite condition number. Then there exists $C_0$ depending on $\mathcal{D}$ such that for n sufficiently large depending on $\mathbb{R}$, we have with probability at least $1-\delta$:

$$\sup_{k\in[K]} |\mathbb{E}_n[h^*(x)] - \mathbb{E}_n[h^*(x)|x \in \mathcal{G}_k] \leq C_0 \cdot \log(2/\delta)^{1/(2+d)} \cdot n^{-1/(4+2d)},$$

where $\mathbb{E}_n$ denotes the expectation over $\mathcal{D}_{[n]}$.

Example Devices and Systems

Figure 2A:
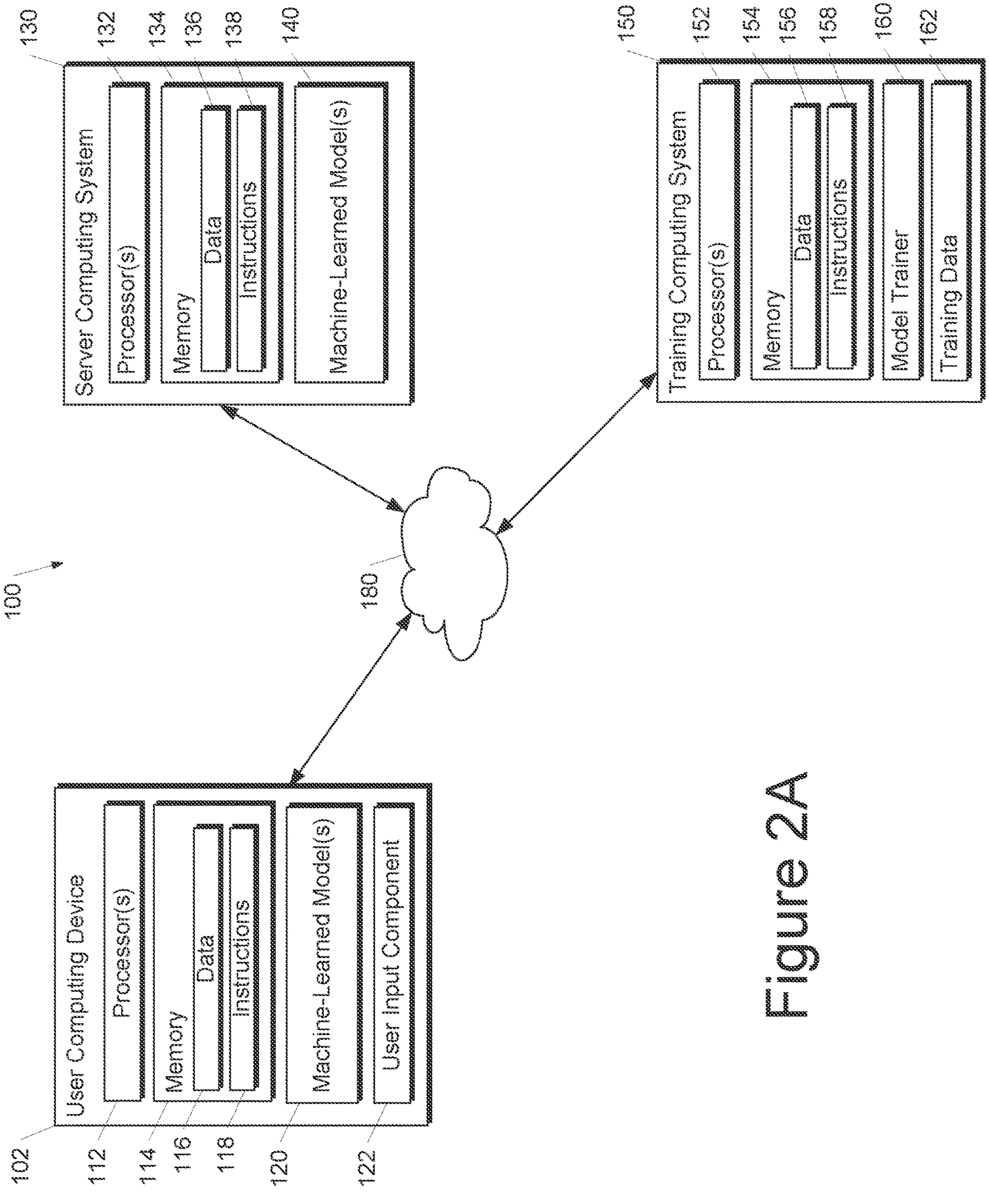
FIG. 2A depicts a block diagram of an example computing system according to example embodiments of the present disclosure.

FIG. 2A depicts a block diagram of an example computing system 100 that performs techniques to reduce bias in machine-learned models according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. The machine-learned models 120 can be, for example, trained to perform classification. Classification can include binary classification or multi-class classification.

As examples, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. In another example, the machine-learned model can be or include a logistic regression classifier model.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. In another example, the machine-learned model can be or include a logistic regression classifier model.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. The model trainer 160 can perform any of the techniques described herein, such as, for example, method 300 of FIG. 3.

In particular, the model trainer 160 can train the machine-learned models 120 and/or 140 based on a set of training data 162. The training data 162 can include, for example, biased training data. In some examples, the training data can be supervised learning data that includes training examples labeled with a "correct" label such as a label applied to the training example by a human labeler. The label can, for example, be a classification output.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 2B:
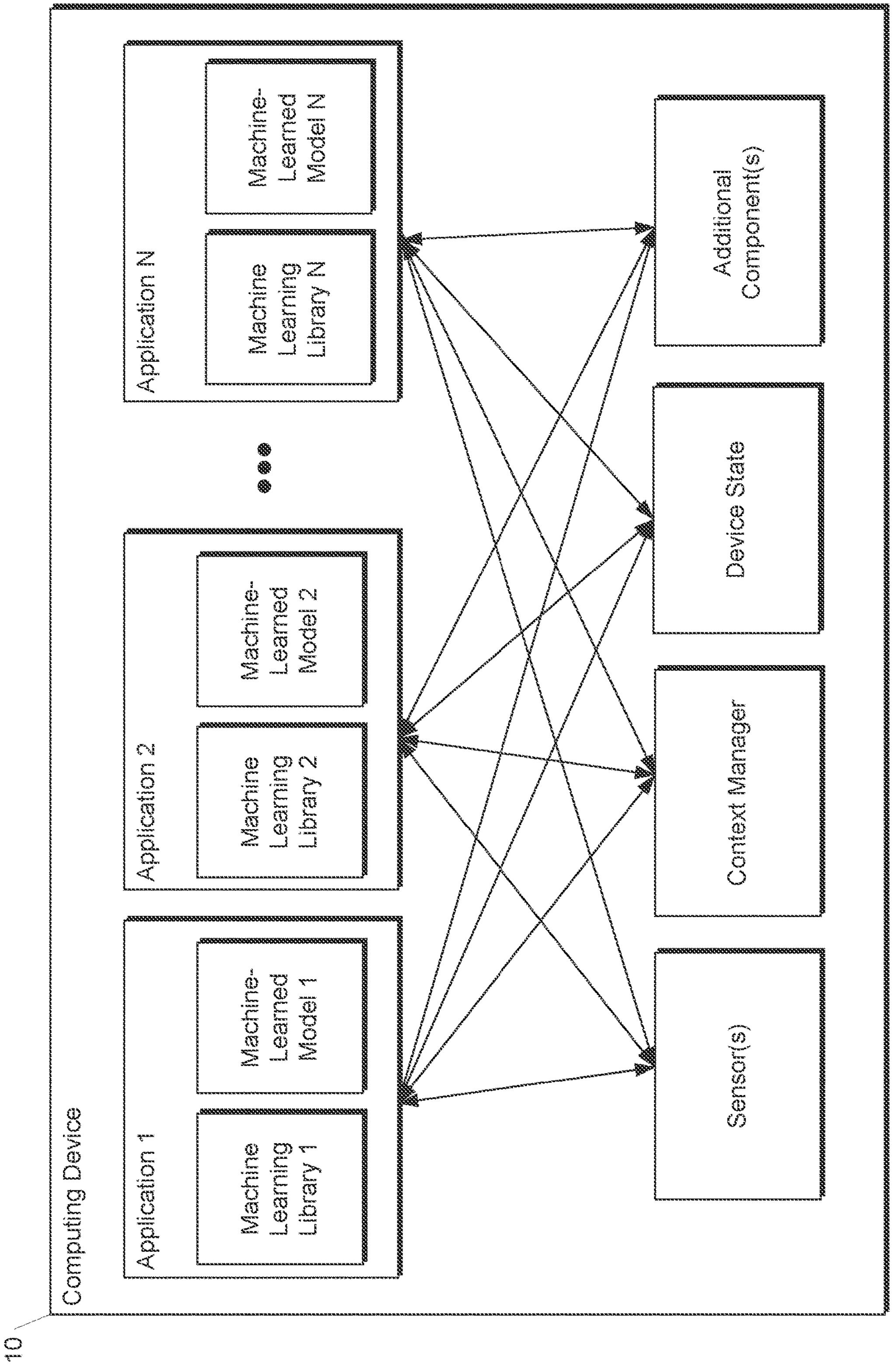
FIG. 2B depicts a block diagram of an example computing device according to example embodiments of the present disclosure.

FIG. 2B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
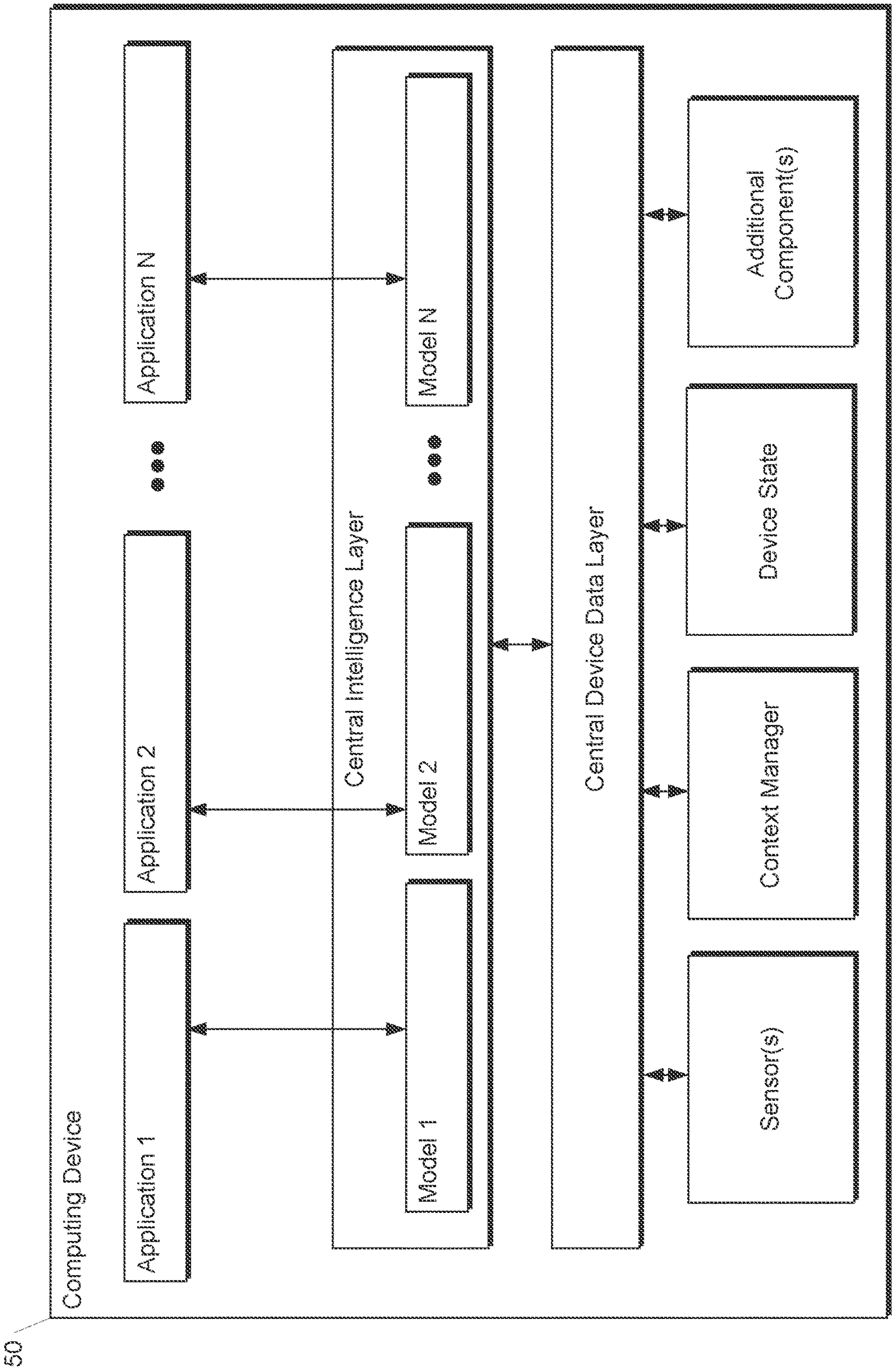
FIG. 2C depicts a block diagram of an example computing device according to example embodiments of the present disclosure.

FIG. 2C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 3:
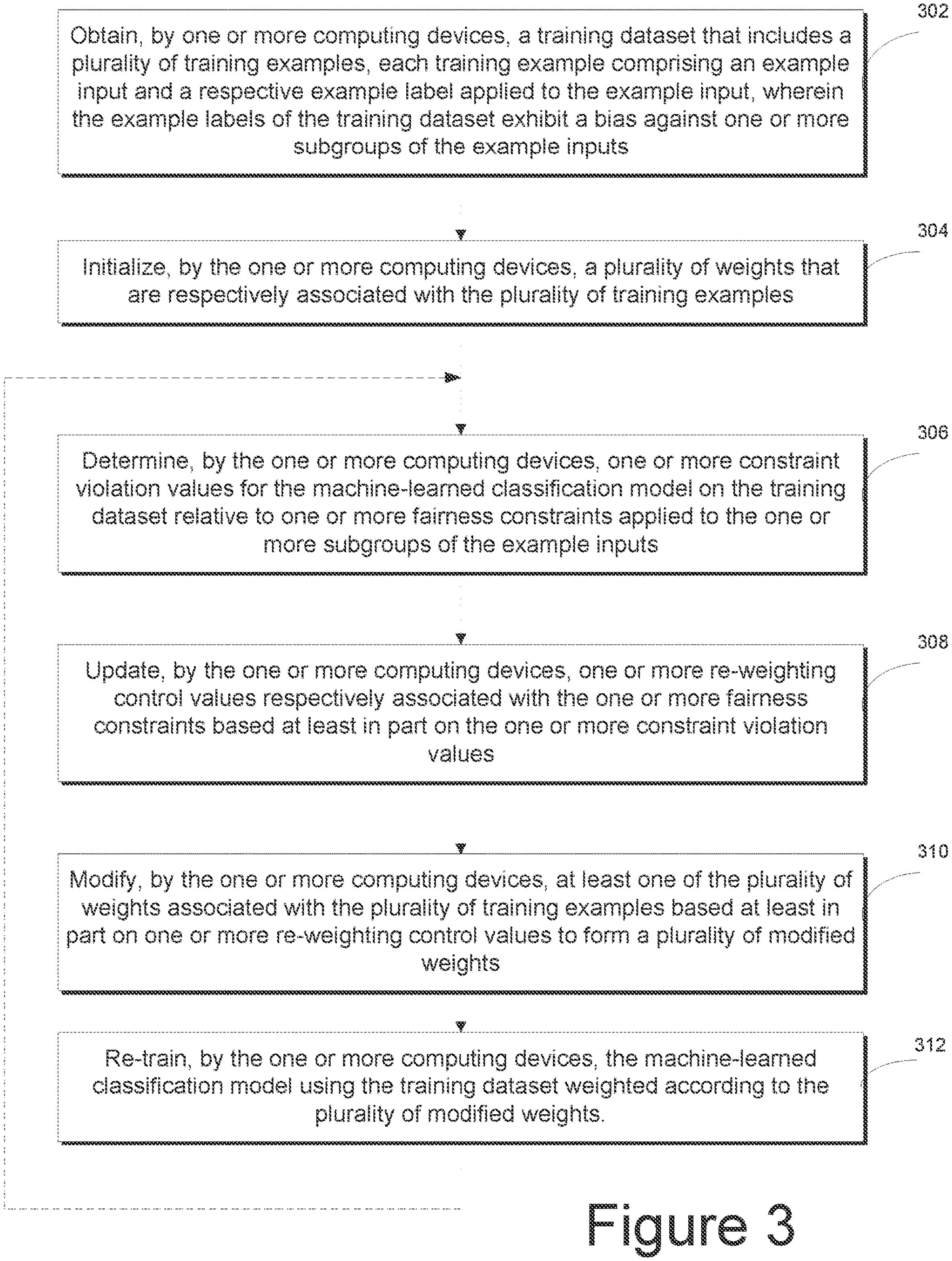
FIG. 3 depicts a flow chart diagram of an example method according to example embodiments of the present disclosure.

FIG. 3 depicts a flow chart diagram of an example method 300 to reduce bias in a machine-learned classification model according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain a training dataset that includes a plurality of training examples. Each training example can include an example input and a respective example label applied to the example input. For example, the example labels of the training dataset can exhibit a bias against one or more subgroups of the example inputs.

At 304, the computing system can initialize a plurality of weights that are respectively associated with the plurality of training examples.

At 306, the computing system can determine one or more constraint violation values for the machine-learned classification model on the training dataset relative to one or more fairness constraints applied to the one or more subgroups of the example inputs.

As examples, the one or more fairness constraints can include one or more of a demographic parity constraint, a disparate impact constraint, or an equal opportunity constraint. As another example, the one or more fairness constraints can include an equalized odd constraint.

At 308, the computing system can update one or more re-weighting control values respectively associated with the one or more fairness constraints based at least in part on the one or more constraint violation values.

In some implementations, a single re-weighting control value can be associated with at least one (e.g., each) of the one or more fairness constraints. In some implementations, multiple re-weighting control values can be associated with at least one (e.g., each) of the one or more fairness constraints. For example, in some implementations, both a true positive re-weighting control value and a false positive re-weighting control value can be associated with at least one of the one or more fairness constraints. In some implementations, the one or more re-weighting control values can be Lagrange multipliers.

In some implementations, updating the one or more re-weighting control values at 308 can include subtracting, from the one or more re-weighting control values, the one or more constraint violation values multiplied by a step size.

At 310, the computing system can modify at least one of the plurality of weights associated with the plurality of training examples based at least in part on one or more re-weighting control values to form a plurality of modified weight.

In some implementations, modifying at 310 at least one of the plurality of weights associated with the plurality of training examples based at least in part on one or more re-weighting control values can include: determining, for each of plurality of weights, an intermediate weight value equal to an exponential raised to a sum of the re-weighting control values for which the corresponding example input is included in the corresponding subgroup; and normalizing the intermediate weight values for the plurality of weights to form the plurality of modified weights.

In some implementations, modifying at 310 at least one of the plurality of weights associated with the plurality of training examples based at least in part on one or more re-weighting control values can have, when a positive prediction rate of the machine-learned classification model with respect to a first subgroup of the example inputs is below a target value, a first effect of increasing the weight associated with training examples in which the corresponding example input is included in the first subgroup and the corresponding example label is a positive label and a second effect of decreasing the weight associated with training examples in which the corresponding example input is included in the first subgroup and the corresponding example label is a negative label.

At 312, the computing system can re-train the machine-learned classification model using the training dataset weighted according to the plurality of modified weights.

After 312, the computing system can optionally return to block 306 and again iteratively perform blocks 306-312. For example, additional iterations can be performed until one or more stopping criteria are met. The stopping criteria can be any number of different criteria including, as examples, a loop counter reaching a predefined maximum, an iteration over iteration change in parameter adjustments falling below a threshold, a gradient of an optimization function being below a threshold value, and/or various other criteria.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to reduce bias in a machine-learned classification model configured without post-processing bias calibration of model outputs, the method comprising:

obtaining, by one or more computing devices, a training dataset comprising a plurality of training examples, each training example comprising an example input and a respective example label applied to the example input, wherein the example labels of the training dataset exhibit a bias against one or more subgroups of the example inputs;

initializing, by the one or more computing devices, a plurality of weights that are respectively associated with the plurality of training examples;

for each of one or more training iterations:

determining, by the one or more computing devices, one or more constraint violation values for the machine-learned classification model on the training dataset relative to one or more fairness constraints applied to the one or more subgroups of the example inputs, wherein the one or more fairness constraints comprise a disparate impact constraint;

updating, by the one or more computing devices, one or more re-weighting control values respectively associated with the one or more fairness constraints based at least in part on the one or more constraint violation values;

modifying, by the one or more computing devices, at least one of the plurality of weights associated with the plurality of training examples based at least in part on the one or more re-weighting control values to form a plurality of modified weights; and re-training, by the one or more computing devices, the machine-learned classification model using the training dataset weighted according to the plurality of modified weights;

wherein both a true positive re-weighting control value and a false positive re-weighting control value are associated with at least one of the one or more fairness constraints.

2. The computer-implemented method of claim 1, wherein a single re-weighting control value is associated with at least one of the one or more fairness constraints.

3. The computer-implemented method of claim 1, wherein the one or more fairness constraints comprise one or more of: a demographic parity constraint, or an equal opportunity constraint.

4. The computer-implemented method of claim 1, wherein the one or more fairness constraints comprise an equalized odds constraint.

5. The computer-implemented method of claim 1, wherein modifying, by the one or more computing devices, at least one of the plurality of weights associated with the plurality of training examples based at least in part on one or more re-weighting control values to form the plurality of modified weights comprises:

determining, by the one or more computing devices, for each of plurality of weights, an intermediate weight value equal to an exponential raised to a sum of the re-weighting control values for which the corresponding example input is included in the corresponding subgroup; and normalizing, by the one or more computing devices, the intermediate weight values for the plurality of weights to form the plurality of modified weights.

6. The computer-implemented method of claim 1, wherein updating, by the one or more computing devices, the one or more re-weighting control values comprises subtracting, from the one or more re-weighting control values, the one or more constraint violation values multiplied by a step size.

7. The computer-implemented method of claim 1 wherein the one or more re-weighting control values comprise Lagrange multipliers.

8. The computer-implemented method of claim 1, wherein modifying, by the one or more computing devices, at least one of the plurality of weights associated with the plurality of training examples based at least in part on one or more re-weighting control values to form a plurality of modified weights has, when a positive prediction rate of the machine-learned classification model with respect to a first subgroup of the example inputs is below a target value, a first effect of increasing the weight associated with training examples in which the corresponding example input is included in the first subgroup and the corresponding example label is a positive label and a second effect of decreasing the weight associated with training examples in which the corresponding example input is included in the first subgroup and the corresponding example label is a negative label.

9. The computer-implemented method of claim 1, wherein the machine-learned classification model comprises an artificial neural network.

10. The computer-implemented method of claim 1, wherein the machine-learned classification model comprises a logistic regression classifier model.

11. Non-transitory computer-readable media storing a machine-learned classification model trained according to the method of claim 1.

12. The computer-implemented method of claim 1, further comprising:

receiving one or more sensor inputs characterizing a state of an environment;

providing data associated with the one or more sensor inputs as input to the machine-learned classification model;

generating, with the machine-learned classification model, one or more classifications associated with the state of the environment based on the data associated with the one or more sensor inputs; and generating a control signal for a machine based at least in part on the one or more classifications.

13. The computer-implemented method of claim 1, further comprising:

receiving input data;

providing the input data as input to the machine-learned classification model;

generating, with the machine-learned classification model, one or more classifications based on the input data; and processing one or more images based at least in part on the one or more classifications.

14. A computer system comprising:

one or more processors; and one or more non-transitory computer readable media that collectively store:

a machine-learned classification model configured without post-processing bias calibration of model outputs; and instructions that, when executed by the one or more processors, cause the computer system to perform operations, the operations comprising:

initializing, by the one or more processors, a plurality of weights that are respectively associated with a plurality of training examples wherein the plurality of training examples comprise a training dataset;

for each of one or more training iterations:

determining, by the one or more processors, one or more constraint violation values for the machine-learned classification model on the training dataset relative to one or more fairness constraints applied to one or more subgroups of the example inputs, wherein the one or more fairness constraints comprise a disparate impact constraint;

updating, by the one or more processors, one or more re-weighting control values respectively associated with the one or more fairness constraints based at least in part on the one or more constraint violation values;

modifying, by the one or more processors, at least one of the plurality of weights associated with the plurality of training examples based at least in part on the one or more re-weighting control values to form a plurality of modified weights; and re-training, by the one or more processors, the machine-learned classification model using the training dataset weighted according to the plurality of modified weights;

wherein both a true positive re-weighting control value and a false positive re-weighting control value are associated with at least one of the one or more fairness constraints.

15. One or more non-transitory computer readable media that collectively store a machine-learned classification model configured without post-processing bias calibration of model outputs and instructions that, when executed by one or more processors, cause a computer system to perform operations, the operations comprising:

obtaining, by one or more computing devices, a training dataset comprising a plurality of training examples, each training example comprising an example input and a respective example label applied to the example input, wherein the example labels of the training dataset exhibit a bias against one or more subgroups of the example inputs;

initializing, by the one or more computing devices, a plurality of weights that are respectively associated with the plurality of training examples;

for each of one or more training iterations:

determining, by the one or more computing devices, one or more constraint violation values for the machine-learned classification model on the training dataset relative to one or more fairness constraints applied to the one or more subgroups of the example inputs, wherein the one or more fairness constraints comprise a disparate impact constraint;

updating, by the one or more computing devices, one or more re-weighting control values respectively associated with the one or more fairness constraints based at least in part on the one or more constraint violation values;

modifying, by the one or more computing devices, at least one of the plurality of weights associated with the plurality of training examples based at least in part on the one or more re-weighting control values to form a plurality of modified weights; and re-training, by the one or more computing devices, the machine-learned classification model using the training dataset weighted according to the plurality of modified weights;

wherein both a true positive re-weighting control value and a false positive re-weighting control value are associated with at least one of the one or more fairness constraints.

16. The one or more non-transitory computer readable media of claim 15, wherein a single re-weighting control value is associated with at least one of the one or more fairness constraints.

17. The one or more non-transitory computer readable media of claim 15, wherein the one or more fairness constraints comprise one or more of: a demographic parity constraint, or an equal opportunity constraint.

18. The one or more non-transitory computer readable media of claim 15, wherein the one or more fairness constraints comprise an equalized odds constraint.

19. The one or more non-transitory computer readable media of claim 15, wherein modifying, by the one or more computing devices, at least one of the plurality of weights associated with the plurality of training examples based at least in part on one or more re-weighting control values to form the plurality of modified weights comprises:

determining, by the one or more computing devices, for each of plurality of weights, an intermediate weight value equal to an exponential raised to a sum of the re-weighting control values for which the corresponding example input is included in the corresponding subgroup; and normalizing, by the one or more computing devices, the intermediate weight values for the plurality of weights to form the plurality of modified weights.

20. The one or more non-transitory computer readable media of claim 15, wherein updating, by the one or more computing devices, the one or more re-weighting control values comprises subtracting, from the one or more re-weighting control values, the one or more constraint violation values multiplied by a step size.

* * * * *